Jan. 30, 1962 J. C. HALEY 3,018,653
DYNAMIC ANALYZER FOR ADVANCED RECONNAISSANCE SYSTEMS
Filed May 6, 1960 5 Sheets-Sheet 2
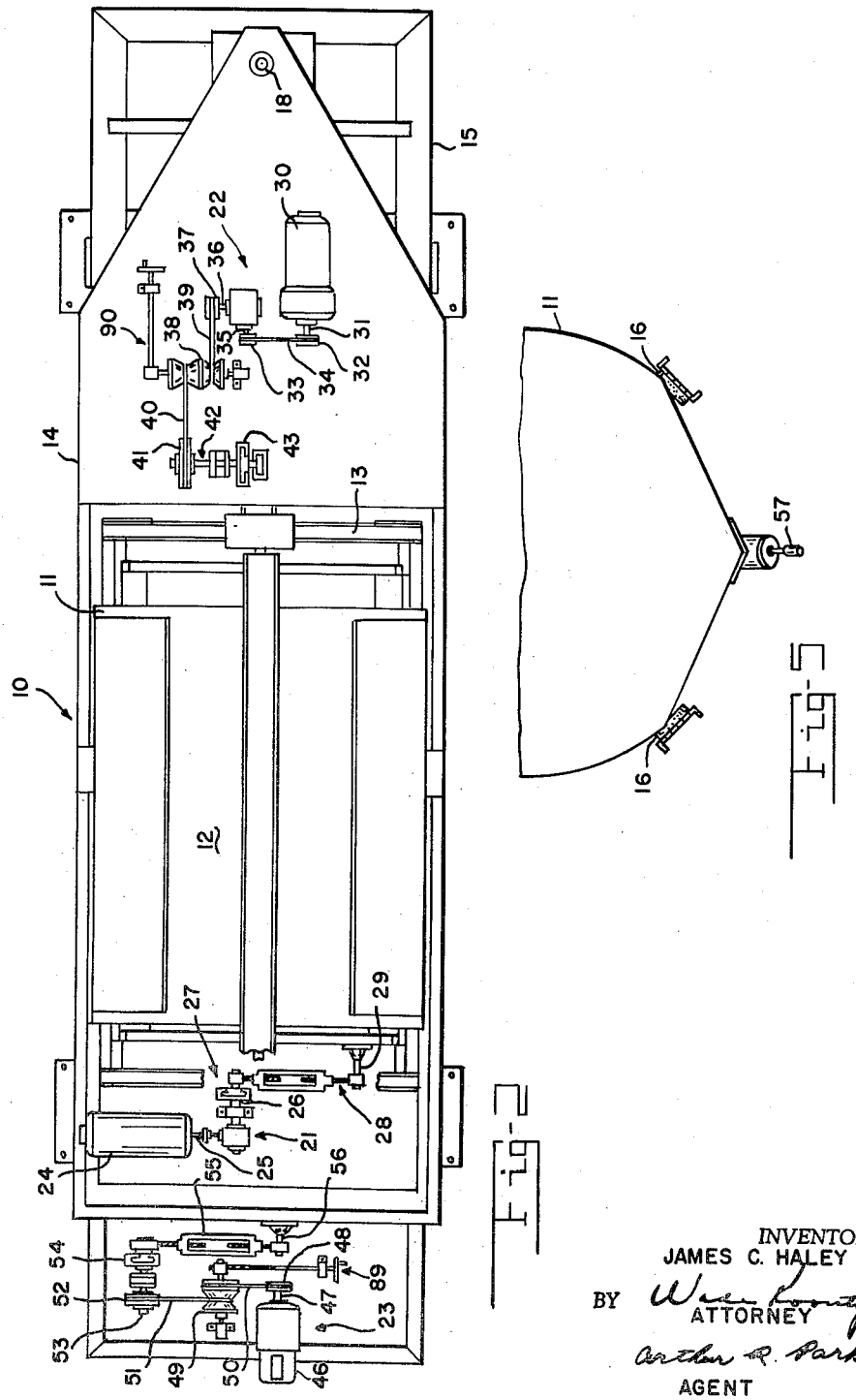
INVENTOR.
JAMES C. HALEY
BY
ATTORNEY
AGENT Jan. 30, 1962 J. C. HALEY 3,018,653
DYNAMIC ANALYZER FOR ADVANCED RECONNAISSANCE SYSTEMS
Filed May 6, 1960 5 Sheets-Sheet 3
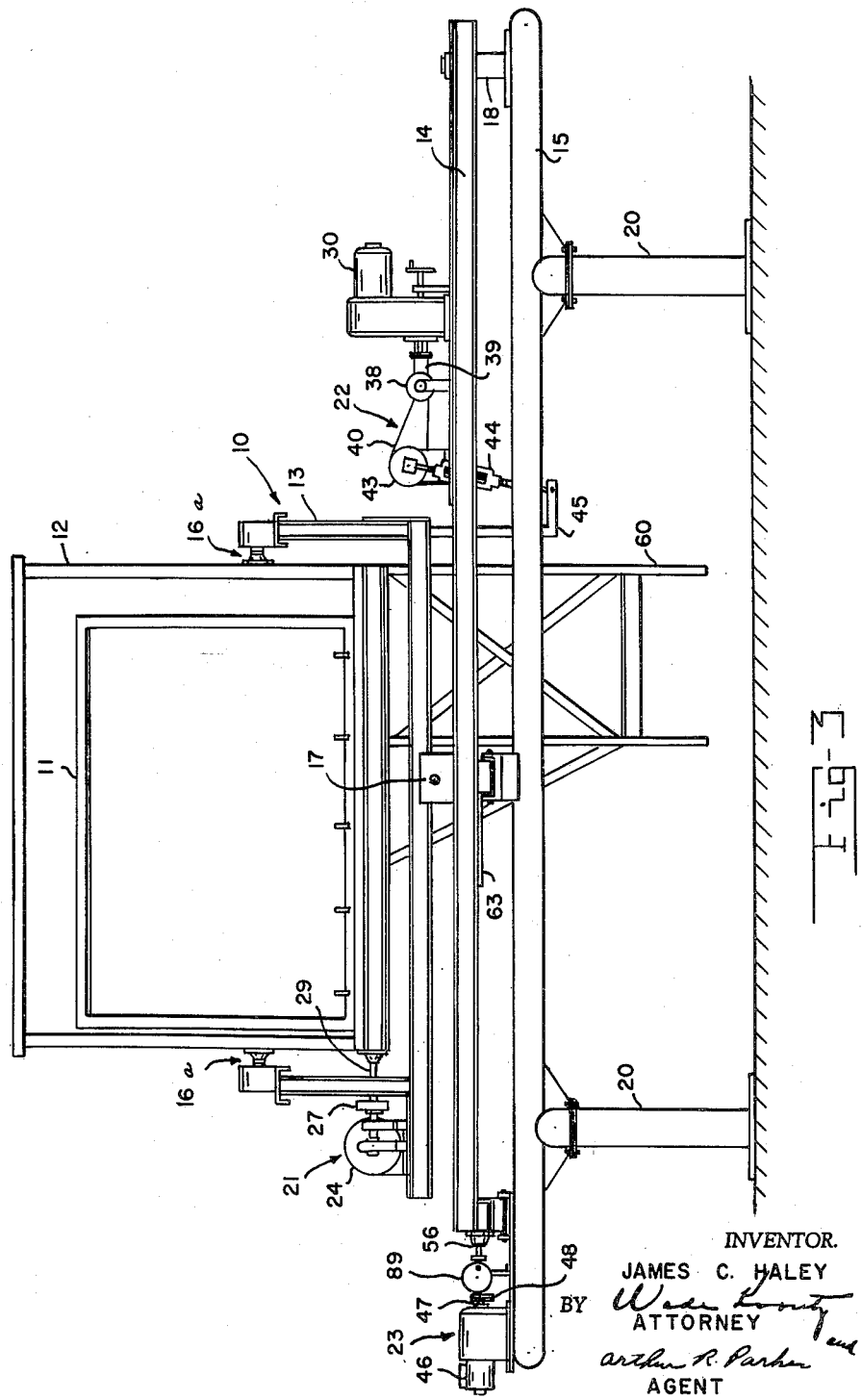
INVENTOR.
JAMES C. HALEY
BY
ATTORNEY
AGENT

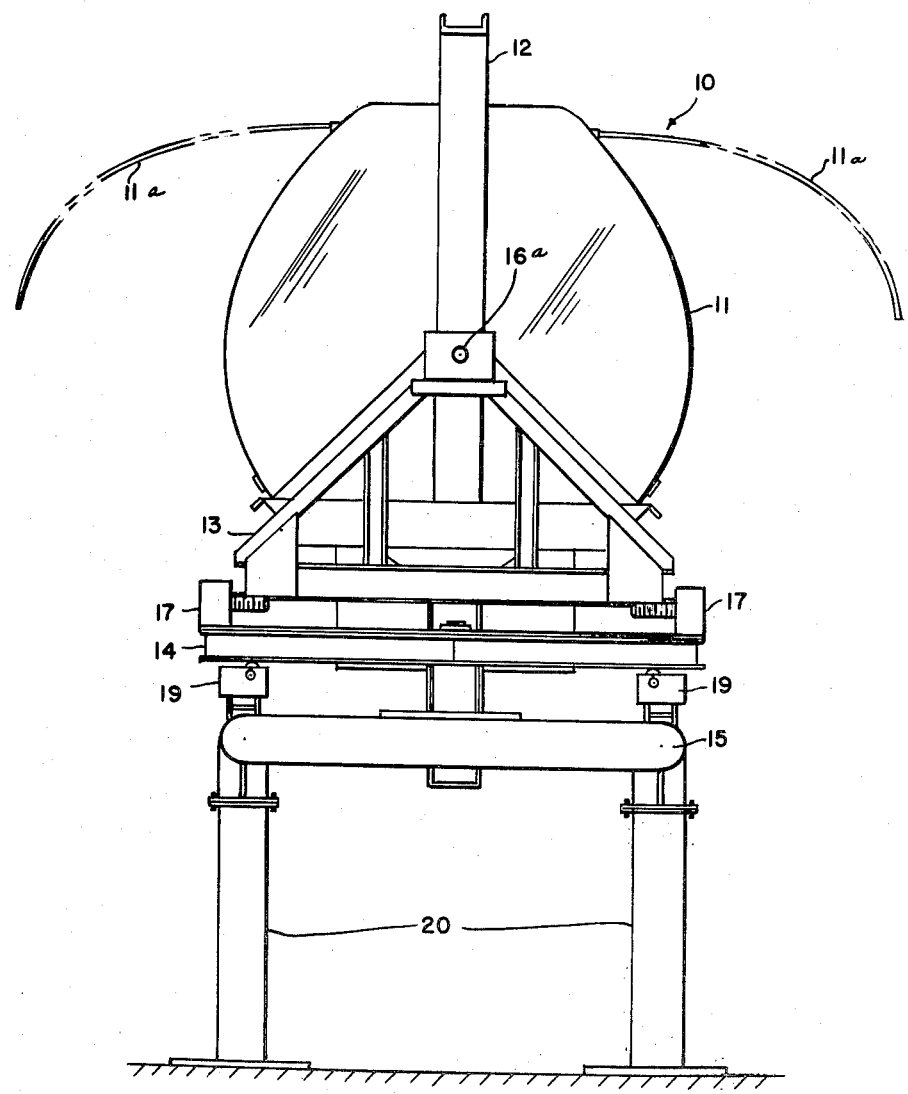

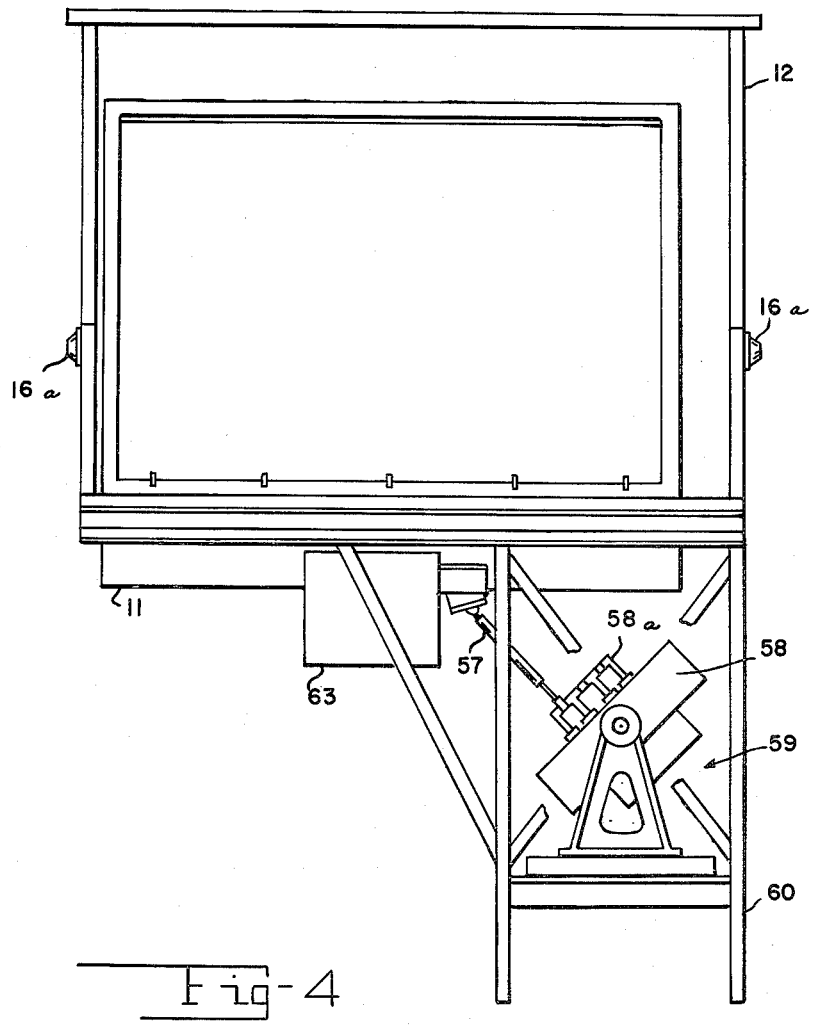

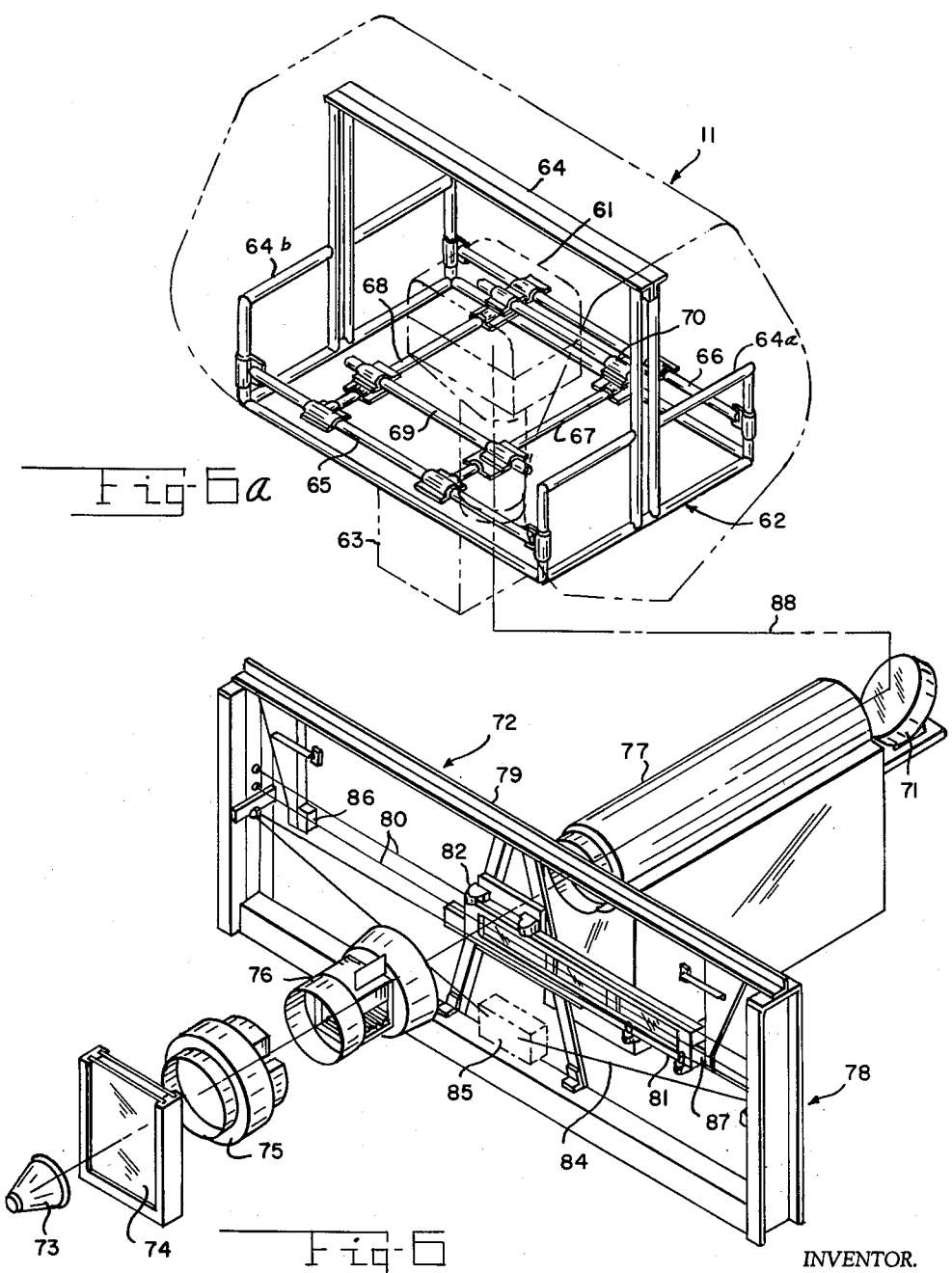

United States Patent Office 3,018,653
Patented Jan. 30, 1962

3,018,653
DYNAMIC ANALYZER FOR ADVANCED
RECONNAISSANCE SYSTEMS
James C. Haley, Dayton, Ohio, assignor to the United
States of America as represented by the Secretary of
the Air Force
Filed May 6, 1960, Ser. No. 27,461
11 Claims. (Cl. 73—1)
(Granted under Title 35, U.S. Code (1952), sec. 266)

The invention described herein may be manufactured and used by or for the United States Government for governmental purposes without payment to me of any royalty thereon.

This invention relates generally to a means for performing design and flight evaluations for aerospace sub-systems and systems and, more particularly, to a means for analyzing the operational capabilities and efficiencies of various reconnaissance sub-systems and systems, as for example, infrared, photographic, television, radar and ferret sub-systems and systems, during simulated ground target and flight conditions.

The operational capabilities of newly developed equipment and mechanisms for use with aerospace devices heretofore has been determined chiefly through the use of a considerable number of actual flight tests. The latter, of course, involves the use of special flight test aircraft involving considerable expenditure of both time and money for each flight test. Moreover, a great many unexplained flight or operational failures have occurred in the past further increasing an already exceedingly costly and time consuming operation. Further, a lack of operational capability of many sub-systems remains unanswered because of the uncertainty and unreliability of many actual flight test results. The above-described situation can no longer be tolerated under present conditions, especially in view of the fact that future sub-systems and systems will operate at ever-increasing altitudes and speeds where reliability and capability becomes even more critical. It has become absolutely mandatory, therefore, that the accuracy and reliability as well as performance characteristics of a variety of reconnaissance systems and sub-systems, some of which are already under development and others of which are in the planning stage, be determined in a rapid and valid manner and various problems associated therewith solved before actual flight tests are undertaken. The latter capability of eliminating a considerable number of costly and time-consuming preliminary flight tests is of especial interest and extremely advantageous, especially due to an existing shortage of operational test aircraft. Thus, future requirements of high speed and high altitude flight must be met through the precise solution of various design problems involving space flight which solution is effected prior to the preliminary flight test phase.

In summary, therefore it is clearly seen that where a reconnaissance sub-system, as for example, a photographic system, is to be evaluated, initially static tests are run thereon to determine its resolution capabilities as well as other optical-film characteristics. After the latter tests are completed, the next step normally would involve further evaluation through means of a pluraltiy of extremely costly and time consuming flight tests in order to determine the operational capabilities of the particular sub-system being evaluated. It is at this point that a lack of suitable laboratory equipment for simulating much of the operational environment of actual flight conditions frequently results in an excessive number of flight test failures and aborted missions. Also, flight test results are frequently poor and the reasons therefor unexplained. The latter disadvantage frequently leads to the costly method of trial-and-error flight test. Furthermore, one mission may result in a random success not necessarily representative of the average capabilites of the particular equipment undergoing test. As a result of one random success, sufficient valid engineering information may not be available in order to form a sound engineering decision to enable the successful elimination of past mistakes and thereby correct future designs accordingly.

It is an object of the present invention, therefore, to provide a dynamic analyzer for demonstrating and evaluating the operational capability and performance characteristics of a reconnaissance sub-system.

It is a further object of the invention to utilize means for subjecting a reconnaissance system to the dynamic conditions normally encountered in actual flight and predicting the results thereof.

An additional object of the invention resides in a dynamic analyzer device for determining the operational performance of an integrated system prior to the incorporation thereof in a flight vehicle.

A still further object of the invention is in a dynamic analyzer arrangement for testing the capability of a variety of reconnaissance systems and sub-systems and determining beforehand the feasibility thereof under prescribed operational conditions.

Another object of the invention provides a unique and improved preflight simulator analyzer device for subjecting sub-systems to simula+ed conditions of operational flight and thus substantially reducing the need for a considerable number of preliminary flight tests.

Other objects and advantages of the invention will become apparent from the following description, taken in connection with the accompanying drawings, in which like reference characters refer to like parts in the several figures.

FIG. 1 is a front elevational view of the dynamic analyzer of the present invention, illustrating details of the relationship of the major components thereof to each other.

FIG. 2 is a top plan view of the dynamic analvzer of FIG. 1, illustrating details of the drive means therefor and the relation thereof to the frame means of the invention.

FIG. 3 is a side elevational view of the dynamic analyzer of FIGS. 1 and 2 illustrating additional details of the frame means and drive means of the invention.

FIG. 4 is a second side elevational view of part of the dynamic analyzer of FIG. 3, illustrating details of the relationship of the vibration exciter to the capsule of the invention.

FIG. 5 is a front view only of the capsule of the invention, showing additional details of its mounting means.

FIG. 6 is a schematic view of the optical system and ground target simulator device utilized with the invention. and FIG. 6a is a second schematic view of the camera support combined therewith.

Referring specifically to FIG. 1 of the drawings, the dynamic analyzer of the invention is indicated generally at 10 as having the major components respectively indicated as the capsule 11 with doors 11a, the roll frame 12, the pitch frame 13, the yaw frame 14 and the base frame 15 mounted in any desired manner on the main support legs 20. The capsule 11, which is adapted to house the particular reconnaissance sub-system and/or sytem to be evaluated, is isolated from the roll frame 12 by means of a set of rubber pads indicated at 16 in FIG. 5 of the drawings, which rubber pads 16 allow capsule 11 to move in three directions simultaneously during a combined three-directional vibration of the inventive devise as will be hereinafter described in more detail.

The aforesaid roll frame 12 rotatably positioned on the pitch frame 13 by means of a pair of ball bearing pivots indicated at 16a interconnected therebetween while the pitch frame 13, in turn, is supported on the yaw frame 14 by means of a pair of pivots 17. The aforesaid yaw frame 14 is pivotally supported adjacent one end thereof on the aforesaid base frame 15 by means of the pivot indicated at 18 (see FIGS. 2 and 3). Additional support is provided for the aforesaid yaw frame 14 as by means of the plurality of yaw rollers indicated at 19.

Referring particularly to FIGS. 2 and 3 of the drawings, it is clearly seen that angular movements are imparted to the above-described roll, pitch and yaw frames indicated, respectively, at 12, 13 and 14 by means of individual mechanical driving devices for each frame. For example, the roll frame drive mechanism is indicated generally at 21 as mounted on the pitch frame 13, whereas, the pitch frame drive mechanism is indicated generally at 22 as mounted on the yaw frame 14 and, finally, the yaw frame drive mechanism is indicated generally at 23 as mounted on the base frame 15. Said roll frame drive mechanism 21 includes a variable speed motor 24 having a drive shaft 25, a bearing supported driven shaft 26 interconnected therewith, and an eccentric wheel arrangement indicated generally at 27 rigidly positioned on one end of said driven shaft 26 and including the adjustable, rigid link 28 eccentrically attached at one end to said eccentric wheel arrangement 27 and interconnected as at 29 to the roll frame 12 at a point substantially below and off-center of the pivots 16a thereof to the pitch frame 13. Thus, operation of the aforesaid variable speed motor 24 of the roll frame drive mechanism 21 effects back-and-forth or oscillatory movement of the eccentric link 28 through movement of the previously described eccentric wheel arrangement 27. In view of the fact that the connection between the aforesaid eccentric link 28 and the roll frame 12 as indicated at 29 is positioned off-center relative to and below the pivots 16a thereof to the pitch frame 13, movement of the aforesaid eccentric link 28 results in pivotal movement or roll of roll frame 12 about said pivots 16a.

The previously mentioned pitch frame drive mechanism 22 likewise includes a second variable speed drive motor 30 having a drive shaft 31 on which is mounted a drive pulley 32 which drive pulley 32 is interconnected with a first driven pulley 33 by means of the first drive belt 34. Said first driven pulley 33 is rigidly positioned on a bearing supported first driven shaft 35 interconnected with a second driven shaft 36 extending in transverse relation thereto. A second driven pulley 37 is rigidly positioned on the aforesaid second driven shaft 36, which pulley 37 is interconnected with a third double-V grooved pulley 38 by means of the second interconnecting driven belt indicated at 39, which belt 39 is in driving engagement between second driven pulley 37 and a selected one of the grooves of said double-V grooved pulley 38. A third interconnecting drive belt 40 is arranged in driving engagement between the other groove of said pulley 38 and a third driven pulley 41 which pulley 41 is rigidly attached to one end of a third drive shaft 42. Shaft 42 is rigidly attached at its other end to an eccentric wheel arrangement 43 including an adjustable, rigid link 44 (note FIG. 3) eccentrically attached thereto and interconnected at the other end by means of the L-shaped bracket 45 to the pitch frame 13. Thus, on operation of the aforesaid accentric wheel arrangement 43 by means of the previously-described pitch frame drive mechanism 22, back-and-forth or oscillatory movement is imparted to said rigid link 44 to, in turn, impart up-and-down movement to one end of said pitch frame 13 to effect rotation thereof about its horizontally disposed pivot 17 on the yaw frame 14.

Again referring to FIGS. 2 and 3 of the drawings, the previously described yaw frame drive mechanism 23 likewise includes a third variable speed drive motor 46 having a main drive shaft 47 on which is positioned a drive pulley 48 which is interconnected with one groove of a double V-grooved bearing-mounted driven pulley 49 by means of the first drive belt 50. The other groove of said double V-grooved pulley 49 is interconnected with a second driven pulley 52 by means of interconnecting second driven belt 51. Said second driven pulley 52 is positioned on one end of a second driven shaft 53 to the other end of which is affixed the eccentric wheel arrangement 54 including an adjustable, rigid link 55 affixed between said eccentric wheel arrangement 54 and one end of the yaw frame 14 as indicated at 56. Thus, operation of the aforesaid eccentric wheel arrangement 54 by means of the previously-described yaw frame drive mechanism 23 imparts a back-and-forth or oscillatory movement to the aforesaid rigid link 55 to, in turn, effect rotation of the yaw frame 14 about its vertically disposed pivot 18 to the base frame 15. Manual operation of either roll frame 12 or yaw frame 14, if desired, may be effected by the manual drive mechanism indicated, respectively, at 89 and 90.

With specific reference to FIG. 5 of the drawings, it is noted that the previously described capsule 11 is isolated from or supported on roll frame 12 by means of the previously mentioned pair of rubber pads or cushions 16 provided on said roll frame at both the front and rear ends thereof. Said capsule 11 is, in turn, retained on the aforesaid pads 16 by means of the rigid vibrator connecting rod 57 (see FIG. 4) which rod is permanently but swivelling attached at one end to the approximate center of gravity of the lower shell of said capsule 11. The other end of said vibrator connecting rod 57 is adapted for rigid connection to the vibration exciter indicated generally at 58 in FIG. 4 of the drawings. The latter may consist of any standard mechanism for imparting the desired vibration to the capsule 11 through the vibrator interconnecting rod 57. Said vibration exciter 58 is mounted on a plurality of intermediate supports indicated generally at 59 which, in turn, are rigidly positioned on the main vibrator support structure indicated at 60 affixed as an extension on the bottom surface of roll frame 12. Moreover, the opposite end of said vibrator connecting rod 57 is adjustably positioned within the adjustment bracket device 58a affixed to one side of the vibration exciter 58 for the purpose of regulating the primary angle through which vibration is imparted.

Referring specifically to FIG. 6a of the drawings, the capsule 11 of the subject invention is illustrated in phantom as housing a camera also shown in phantom at 61 to be tested in accordance with the present invention. The aforesaid camera 61 is adapted to be supported in position within an adjustable tubular frame indicated generally at 62 mounted within the capsule 11. Beneath camera 61 is located the camera well also shown in phantom at 63. The aforesaid tubular frame 62 includes a main outer frame portion 64 having a pair of side frame portions 64a and 64b extending in fixed, parallel and spaced relation to each other. A first pair of relatively elongated frame support members 65 and 66 extend between said pair of side frame portions and are adjustably positioned thereon as clearly illustrated. A second pair of relatively short frame support members 67 and 68 are adjustably positioned in spaced, parallel relation between and at right angles to said first pair of relatively elongated frame support members 65 and 66, and a third pair of relatively short frame support members 69 and 70 are again adjustably positioned in spaced, parallel relation and extending between and at right angles to said second pair of relatively short frame support members 67 and 68. The aforesaid camera 61 is mounted in any desired manner to said third pair of relatively short frame support members 69 and 70 and because of the adjustable connection between the various pairs of frame support members, camera 61 may be adjusted to a variety of positions within the adjustable tubular frame 62 in order to facilitate the operation and test evaluation thereof.

Directly beneath the aforesaid capsule 11 is mounted the previously described camera well 63 which may consist of a housing directly attached to said capsule 11. Said housing or camera well 63 may contain an optical photographic window (not shown) directly over and in vertical alignment with the optical axis 88 of a front silvered mirror indicated at 71 (note FIG. 6) which mirror 71 is mounted on a 45° angle to the vertical. The aforesaid mirror 71 further constitutes part of the optical system of the invention which optical system is indicated in general at 72 as incorporating a light source 73, a heat dispenser device consisting of double-walled liquid container 74, an external shutter 75, a filter holder 76, a 48 inch collimator 77 whose optical axis coincides with the horizontal axis of said front silvered mirror 71, and the ground target simulator device of the invention indicated generally at 78 as interposed in the optical path between said filter holder 76 and said collimator 77 for a purpose to be hereinafter explained in detail.

The above-mentioned ground target simulator device 78 incorporates preferably a main open framework ground target device support element 79, preferably elongated and extending at right angles to the optical axis. Said open framework support element 79 includes a pair of relatively elongated ground target simulator device cables 80 extending in spaced, parallel and taut relation between opposite sides of said support element 79 and providing support for the target support track element indicated at 81 which target support rack element 81 constitutes a relatively elongated device slidably positioned between said pair of cables 80 by means of a plurality of cable-engaging target track rollers 82 positioned on opposite ends thereof and slidably engaged with cables 80. The aforesaid target support track element 81 is adapted to incorporate therein any suitable simulated ground target or landscape intended to be recorded by camera 61 while the latter is being subjected to a series of tests. A third cable indicated at 84 is attached at opposite ends thereof to opposite ends of the aforesaid target support track element 81 which cable 84 is adapted to be actuated by a drive motor indicated schematically at 85 to effect back-and-forth or oscillatory movement to said target support track element 81 and the simulated ground target incorporated therein. A pair of cushion or bumper devices indicated at 86 and 87 are interiorly positioned on opposite ends of the ground target simulator device 78 in order to limit movement of the aforesaid target support track element 81 during its back-and-forth movement. The speed of movement imparted to the target support track element 81 is controlled as desired to accurately simulate a ground target moving at a given ground speed and altitude. The purpose of the previously mentioned collimator 77 is to provide collimated light from the ground target simulator device 78 to the aforesaid camera 61 along the optical axis indicated at 88 in order to correctly simulate the desired altitude effects. The previously described front silvered mirror 71 is mounted at a 45° angle for the express purpose of reflecting the horizontal collimated beam of light in an upward, vertical direction in alignment with the optical axis of camera 61 when the latter is in its vertical position and centered within the tubular frame 62. The aforesaid filter holder 76 is positioned directly behind the moving simulated targets incorporated within target support track element 81 both to provide control of the intensity and color temperatures of the exposed light being received therethrough from light source 73. The previously mentioned shutter 75 is provided to effect more flexibility in that exposures may be made external to the camera or other reconnaissance equipment positioned within capsule 11.

At each of the previously described pivots, as for example, the pivots 16a positioned between the roll and pitch frames 12 and 13, position sensors may be provided for electrical interconnection with a six-channel recorder device (not shown) for feeding signals thereto in order to automatically record the dynamic position of each frame. In addition, a separate control device is provided for controlling the speed of movement of the ground target simulator device 73 as hereinbefore stated. Further, other controls may be provided for running various other tests. Moreover, the control for the vibration exciter 58 may be remotely located relative to the position of the inventive dynamic analyzer in order to control both the frequency and amplitude of the vibration applied thereby during test operations. However, the electrical controls mentioned above are not shown since they do not form a part of the present invention.

For the purpose of describing the invention only, it is noted that a camera assembly is utilized; however, as hereinbefore stated, the particular sub-system or system to be evaluated through use of the present invention is unimportant since the particular nature thereof forms no part of the present invention. In other words, a variety of other types of reconnaissance sub-systems, as for example, infrared, television, radar, and ferret may be utilized for mounting within the capsule 11 of the inventive dynamic analyzer without departing from the true spirit or scope of the invention. The aforesaid camera 61 is mounted, as hereinbefore suggested, to the previously described pair of relatively short frame support members 69 and 70 of the adjustable tubular frame 62 within the capsule 11. The ground target simulator device 78 of the optical system 72 is then put into operation and the previously described collimated beam carrying images of simulated moving targets is reflected vertically upward in alignment with the optical axis 88 of said camera 61. The rate of movement of the moving simulated targets is controlled to conform with a corresponding speed and altitude which will normally be encountered during actual flight conditions. After static test and evaluation of the camera sub-sytem within the dynamic analyzer has been completed and certain design deficiencies and/or degradation occuring during the operation of the camera 61 been determined and rectified, the aforesaid subsystem is operated within the dynamic analyzer of the present invention and evaluated under simulated dynamic conditions. The aforesaid static test normally consists in simply operating each individual component of the particular sub-system and determining any degradation in performance thereof under normal operation. Thus, any inherent design faults in the individual components of the sub-system is first determined and eliminated by redesign, if possible, or rejected without further test; however, if each of the individual components reaches the required performance level, dynamic evaluation thereof through use of the inventive device is then accomplished in the manner to be described in more detail hereinafter.

The camera to be dynamically analyzed and evaluated is indicated in phantom at 61 in FIG. 6a of the drawings, as hereinbefore stated, as being positioned within the previously mentioned capsule 11. The particular ground target or target strip to be simulated is positioned within the target support track element 81, which target support track element 81 is then oscillated back-and-forth on the pair of target support track cables 80 by means of the third or operating cable 84 and drive motor 85 between oppositely disposed bumper devices 86, 87 which determine the left and right extent of movement. The speed with which the aforesaid target support track element 81 is operated corresponds to the apparent movement of an actual ground target which would occur during actual flight conditions at a given altitude and speed of the aircraft or other reconnaissance vehicle. The collimated light beam carrying the simulated ground target images is reflected vertically upwardly along the optical axis 88 by means of the mirror 71 as previously stated to be sensed by the camera 61. The dynamic capability of the aforesaid camera sub-system is then determined. The latter operation includes a setting of certain flight variables into the inventive dynamic analyzer and then testing the operation of camera 61 simultaneously with operation of the ground target simulator device 78 in the manner hereinbefore described. Some of these flight vehicles including subjecting the camera 61 to the roll, pitch and yaw characteristics normally encountered under actual flight conditions. Thus, the roll characteristic may be simulated by means of actuation of the previously described roll frame 12 through operation of the drive mechanism 21 as hereinbefore described. In addition, pitch and yaw characteristics may likewise be imparted to the capsule 11 and the camera sub-system mounted therein by means of the drive mechanism indicated, respectively, at 22 and 23 likewise as hereinbefore explained. The aforesaid roll, pitch and yaw movements may be applied to capsule 11 and camera 61 mounted therein either individually or collectively, as desired. At the same time, considerable vibration may be imparted to the camera 61 by means of the previously described vibration exciter or shaker device 58 and the connection thereof to capsule 11 through connecting rod 57. Of course, the effect of varying altitude and ground speed may be easily accomplished by varying the rate of oscillation or back-and-forth movement imparted to the ground target simulator device 78. The effect of all of the aforesaid characteristics on camera 61 which are normally encountered only during actual flight conditions may then be observed and any deficiencies noted and eliminated prior to actual flight testing. Heretofore, the above-described conditions of flight involving the variables of pitch, roll and yaw, for example, were not evaluated prior to actual flight as is now feasible with the dynamic analyzer device of the subject invention. Thus, the effect of these variables on the systems and sub-systems being evaluated may now be eliminated and/or separated from the effect of other variables occurring during flight and thus greatly simplify a complex problem before actual flight tests. In this manner, the actual deficiencies, if any, inherent in a particular system itself may now be more easily separated from those variables normally incidental to the actual flight itself.

Thus, a unique and improved dynamic analyzer has resulted from the present invention wherein the operational capabilities and performance characteristics of a variety of reconnaissance systems and sub-systems become known and demonstrated prior to the actual flight test phase. Moreover, the dynamic analyzer of the subject invention provides a simple and yet unique system for predetermining the feasibility and predicting the results of the particular sub-system or system being tested and evaluated prior to the costly and time consuming operation of actually mounting the particular system or sub-system, as for example, a camera, within the flight test vehicle and then performing a whole series of flight tests which can, of course, be very long and extremely costly. In other words, the present inventive dynamic analyzer enables the testing of various reconnaissance systems prior to flight test and thus often effecting redesign and/or elimination of equipment before any flight tests have been accomplished. Thus, where operational requirements are not met, prompt design action is assured to remedy the fault discovered, if possible, and improve the system to an acceptable form.

I claim:

1. In a dynamic analyzer for testing the performance characteristics of reconnaissance and other systems and sub-systems prior to their operational use, a base frame, yaw frame pivotally mounted on said base frame for movement about a pivot disposed on a vertical axis, a pitch frame pivotally mounted on said yaw frame for movement about a pivot disposed on a horizontal axis extending transverse to said yaw pivot, a roll frame pivotally mounted on said pitch frame for movement about a pivot disposed on a horizontal axis extending transverse to the pitch frame pivot axis, a capsule adapted to contain a reconnaissance sub-system to be tested and an optical, photographic window vertically aligned therewith, and a ground target simulator device including optical means for simulating altitude and ground targets moving at a predetermined speed and reflecting images thereof vertically upward through said optical, photographic window, each of said roll, pitch and yaw frames having eccentric drive means operatively engaged therewith for imparting angular movements thereto resulting in the application of roll, pitch and yaw characteristics to said capsule and the reconnaissance sub-system positioned therein.

2. In a dynamic analyzer as in claim 1, and means for vibrating said capsule and the reconnaissance sub-system mounted therein at a variable resultant angle, said vibrating means comprising a vibration shaker device including a base portion rigidly mounted on said roll frame, an adjustably positioned main vibrator mounted on said base portion at a resultant angle thereto and a rigid vibrator rod interconnected between said main vibrator and the bottom of said capsule for maintaining a preselected resultant angle and for imparting vibration thereto on actuation of said vibrating means.

3. In a dynamic analyzer as in claim 1, said roll drive means including a variable speed motor mounted on said pitch frame and having a drive shaft, a driven shaft in driving engagement therewith, an eccentric wheel rigidly positioned on one end of said driven shaft and an adjustable, rigid link eccentrically attached on one end to said eccentric wheel and interconnected at the other end thereof to said roll frame at a point below and off center of its pivot axis.

4. In a dynamic analyzer as in claim 1, said pitch frame drive means comprising a second variable speed motor including a drive shaft mounting a drive pulley, a driven pulley in driving engagement with said drive pulley, a second driven pulley in interconnecting, driving engagement with said first-named driven pulley, a double-V grooved pulley in driving engagement with said last-named pulley, an eccentric shaft incorporating an eccentric wheel and in driving engagement with said double-V grooved pulley, an adjustable, rigid link eccentrically attached at one end to said eccentric wheel, and means mounted on said pitch frame interconnected with the other end of said link.

5. In a dynamic analyzer as in claim 1, said ground target simulator and optical means comprising a light source, a heat dispenser element, an externally positioned shutter device, a filter holder element, a collimator device for collimating light, a front-silvered mirror positioned at a 45° angle and having a horizontally disposed optical axis coinciding with the optical axis of said collimator and reflecting light passed therefrom in a vertical, upward direction through said optical, photographic window in vertical alignment with the photo reconnaissance system mounted within said capsule, and a ground target simulator device positioned between said collimator device and said filter holder element and incorporating a plurality of simulated ground targets moving back-and-forth in a plane extending transversely of the optical axis at any predetermined speed corresponding to actual flight conditions of rate of movement and altitude.

6. In a dynamic analyzer as in claim 5, said ground target simulator device comprising an open framework, relatively elongated, main simulator ground target device extending in a vertical plane at right angles to the optical axis, a pair of horizontal, relatively elongated main support cables extending in spaced, parallel relation between opposite sides of said open framework, a target track device incorporating a plurality of simulated ground targets and slidably positioned between said pair of support cables, variable speed motor-driven cable means attached to said target track device on opposite sides thereof for oscillating said target track device and the plurality of targets incorporated thereon back-and-forth directly in the path of the beam of light being passed from said filter holder element to said collimator device at a predetermined rate to simulate movement of a plurality of targets under actual flight conditions.

7. A dynamic analyzer for simulating the roll, pitch and yaw characteristics of actual flight conditions and the effect thereof on reconnaissance systems and sub-systems prior to actual flight comprising a main support frame, a yaw frame pivotally mounted adjacent one end thereon in a horizontal plane and having a plurality of rollers attached to the underside thereof in supporting contact on said main support frame and a pair of gimbals provided on the upper surface and on opposite sides thereof, a pitch frame pivotally mounted on said pair of gimbals for pivotal movement in an up-and-down direction about an axis extending transverse to the pivot of said yaw frame, a capsule housing the reconnaissance system or sub-system to be tested supported on said roll frame, said pitch frame incorporating a second pair of gimbals on the upper surface and on opposite sides thereof on an axis extending in transverse relation to said first-named pair of gimbals, a roll frame pivotally mounted on and between said second pair of gimbals for pivotal movement about a longitudinally extending axis, separate drive means for each of said frames imparting roll, pitch and yaw characteristics thereto, said roll frame incorporating a plurality of rubber pads for supporting said capsule thereon in cradled relation, means retaining said capsule in cradled relation on the rubber pads of said roll frame comprising a vibration shaker device rigidly and adjustably attached between said capsule and said roll frame, reconnaissance sub-system mounting means positioned within said capsule and adaptable to support a reconnaissance sub-system having an optical photographic window aligned with the vertical axis thereof, and optical means for simulating and passing a collimated beam of light in a direction in alignment with an optical axis of said reconnaissance sub-system, said optical means incorporating a movably mounted simulated ground target device having drive means for driving said simulated ground target device at a rate of movement corresponding to a true altitude and speed simultaneously with the operation of said separate drive means for respectively imparting roll, pitch and yaw movements to said capsule and the reconnaissance system positioned therein.

8. A dynamic analyzer as in claim 7, said reconnaissance sub-system mounting means comprising an outer tubular frame rigidly positioned within said capsule and including an outer pair of spaced, parallel relatively elongated frame members, an intermediate pair of spaced parallel frame members adjustably positioned between and extending transversely of said pair of outer frame members and an inner pair of spaced, parallel frame members adjustably supported on said intermediate pair of frame members and adapted to support the mounts for said reconnaissance sub-system.

9. A dynamic analyzer as in claim 7, said vibration shaker device incorporating a vibration exciter mounted at a predetermined angle on said roll frame and having an adjustment element affixed thereto and incorporating a plurality of restricted openings therein, and interconnecting vibration exciter rod affixed at one end to said capsule and positioned at the other end within a selected restricted opening of said adjustment element to actuate said capsule at a predetermined resultant angle.

10. A dynamic analyzer as in claim 7, said optical means including a light source, filter means, collimator means, front silvered mirror means mounted at a 45° angle with its horizontal axis in alignment with the optical axes and reflecting light received from said collimator upwardly for sensing by said reconnaissance sub-system, simultaneously with the application of angular movements thereto by operation of said separate drive means for each of said roll, pitch and yaw frames.

11. A dynamic analyzer as in claim 10, said optical means further including a ground target simulator having a main supporting simulated ground target device, a simulated ground target supported within said ground target device for back-and-forth movement therein transverse to the optical axis and endless drive means attached to said simulated ground target and controlled to adjust the rate of movement thereof according to a predetermined speed and altitude.

References Cited in the file of this patent
UNITED STATES PATENTS

| 2,470,773 | Haskins | May 24, 1949 |
| 2,490,574 | Austin | Dec. 6, 1949 |